United States Patent
Lewerenz et al.

(10) Patent No.: US 10,886,830 B2
(45) Date of Patent: Jan. 5, 2021

(54) MAGNETIC CLUTCH ARRANGEMENT AND APPARATUS COMPRISING A MAGNETIC CLUTCH ARRANGEMENT

(71) Applicant: ITT Bornemann GmbH, Obernkirchen (DE)

(72) Inventors: Jorg Lewerenz, Nienstaedt (DE); Marco Nehring, Niedernwohren (DE)

(73) Assignee: ITT Bornemann GmbH, Obernkirchen (DE)

( * ) Notice: Subject to any disclaimer, the term of this patent is extended or adjusted under 35 U.S.C. 154(b) by 319 days.

(21) Appl. No.: 16/062,939

(22) PCT Filed: Nov. 25, 2016

(86) PCT No.: PCT/EP2016/078869
§ 371 (c)(1),
(2) Date: Jun. 15, 2018

(87) PCT Pub. No.: WO2017/108334
PCT Pub. Date: Jun. 29, 2017

(65) Prior Publication Data
US 2019/0006932 A1    Jan. 3, 2019

(30) Foreign Application Priority Data
Dec. 21, 2015   (DE) .................. 10 2015 122 404

(51) Int. Cl.
*H02K 49/10*   (2006.01)
*F04D 13/02*   (2006.01)

(52) U.S. Cl.
CPC ......... *H02K 49/106* (2013.01); *F04D 13/027* (2013.01); *H02K 49/10* (2013.01);
(Continued)

(58) Field of Classification Search
CPC ........................ H02K 49/106; H02K 49/108
(Continued)

(56) References Cited

U.S. PATENT DOCUMENTS

| | | |
|---|---|---|
| 4,486,176 A | 12/1984 | Tardieu et al. |
| 5,708,313 A | 1/1998 | Bowes |

(Continued)

FOREIGN PATENT DOCUMENTS

| | | |
|---|---|---|
| DE | 2106183 A1 | 8/1972 |
| DE | 7617184 U1 | 2/1979 |

(Continued)

OTHER PUBLICATIONS

English Language Abstract of EP1002954.
(Continued)

*Primary Examiner* — Gary A Nash
(74) *Attorney, Agent, or Firm* — Moritt Hock & Hamroff LLP; Bret P. Shapiro

(57) ABSTRACT

Magnetic clutch arrangement for connecting an output shaft (1) of a drive (10) to a drive shaft (2) of a working machine (20), —having a hub (11, 21), —the hub (11, 21) has a hollow space (12, 22); —a first set of magnets (13, 23) is arranged in the hollow space (12, 22); —having a cardan shaft head (14, 24) which is arranged in the hollow space (12, 22) in the hub (11, 21); —a second set of magnets (15, 25) is arranged on the circumference of the cardan shaft head (14, 24); —the cardan shaft head (14, 24) and the hub (11, 21) are coupled either to the drive shaft (2) or output shaft (1) so as to transmit torque; the cardan shaft head (14, 24) is tilted through an angle α in the hollow space (12, 22) of the hub (11, 21), so that an asymmetrical gap (50) is formed between the hub (11, 21) and the cardan shaft head (14, 24).

15 Claims, 4 Drawing Sheets

Figure 1:
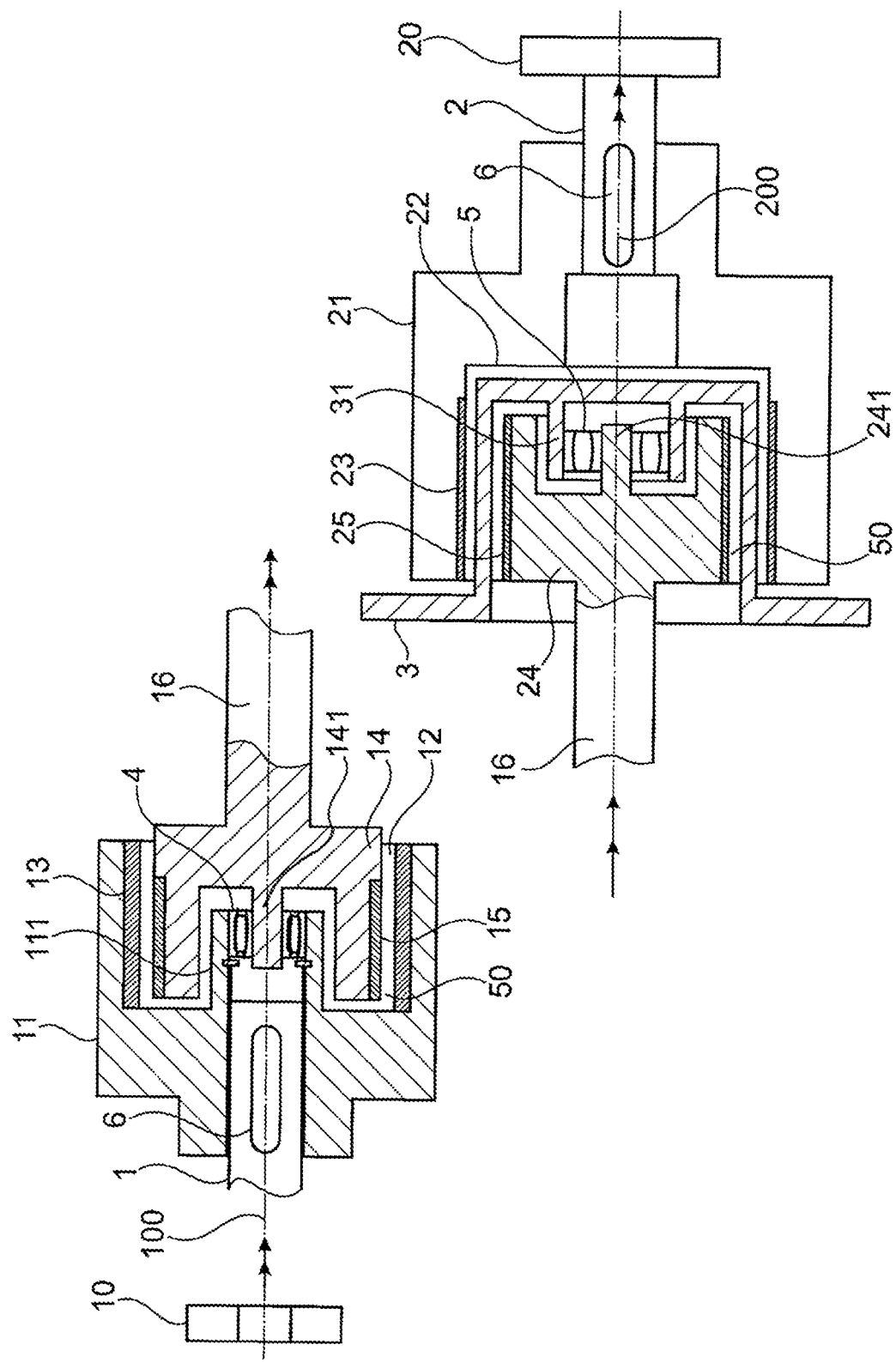

(52) U.S. Cl.
CPC ....... *H02K 49/108* (2013.01); *H02K 2213/03* (2013.01); *H02K 2213/09* (2013.01)

(58) Field of Classification Search
USPC .................................................. 310/103, 104
See application file for complete search history.

(56) References Cited

U.S. PATENT DOCUMENTS

| | | | |
|---|---|---|---|
| 6,293,773 | B1 | 9/2001 | Doberstein et al. |
| 2006/0111191 | A1* | 5/2006 | Wise ............... H02K 49/10 464/29 |
| 2007/0296295 | A1* | 12/2007 | Cruz ............... H02K 49/106 310/103 |
| 2008/0150383 | A1* | 6/2008 | Groening ......... H02K 49/106 310/105 |

FOREIGN PATENT DOCUMENTS

| | | |
|---|---|---|
| DE | 3237197 A1 | 4/1983 |
| DE | 202009005468 U1 | 9/2010 |
| EP | 0034992 B1 | 5/1983 |
| EP | 1002954 A2 | 5/2000 |
| JP | S61173663 A | 8/1986 |
| JP | H05153765 A | 6/1993 |
| JP | H1198814 A | 4/1999 |
| RU | 2216662 C1 | 11/2003 |
| WO | 2008127487 A1 | 10/2008 |
| WO | WO-2010148990 A1 * | 12/2010 ........... H02K 49/108 |
| WO | WO-2010148991 A1 * | 12/2010 ........... H02K 49/106 |

OTHER PUBLICATIONS

English Language Abstract of JP11098814.
English Language Abstract of DE2009005468 U1.
English Language Abstract of JP05153765.
English Language Abstract of JP61173663.
English Language Abstract of DE2106183A.
English Language Abstract of DE 7617184U1.
English Language Abstract of EP0034992B1.

* cited by examiner

MAGNETIC CLUTCH ARRANGEMENT AND APPARATUS COMPRISING A MAGNETIC CLUTCH ARRANGEMENT

The invention relates to a magnetic clutch arrangement for connecting a drive shaft of a drive to a drive shaft of a working machine as well as to an apparatus comprising such a magnetic clutch arrangement. For this purpose, a hub is provided which can be fixed on a first shaft, for example the drive shaft, the output shaft, or a cardan shaft, between the drive and the working machine so as to transmit torque. The hub has a hollow space, in which a first set of magnets is arranged, preferably on the circumference on the inside of the hollow space and at regular intervals to each other in the circumferential direction. A cardan shaft head is arranged in the hollow space of the hub. A second set of magnets is arranged on the circumference of the cardan shaft head, wherein the cardan shaft head and the hub are coupled to one of the shafts, for example the drive shaft, output shaft, or cardan shaft, so as to transmit torque. The coupling of the drive to a working machine can be carried out directly by directly fixing the cardan shaft head on one of the two drive or output shafts or by a separate shaft, a cardan shaft. The hub can in particular be fixed on the output shaft of the drive so as to transmit torque, while the cardan shaft head is coupled to the drive shaft of the working machine so as to transmit torque; in principle, a reverse assignment of the hub and cardan shaft head to the shafts of the drive and of the working machine is however also possible, intended, and implemented. In addition, the arrangement of the hub or of hubs on a cardan shaft and the design of the drive and output shafts with cardan shaft heads is possible, intended, and implemented.

Cardan shafts are often used for machines in which incorrect positions, eccentricities, or an offset between the drive and working machine, which go beyond a common compensating capability of traditional clutches, are to be compensated for. With respect to an electrical separation of the working machine from the driving engine, cardan shafts are disadvantageous; the possibility of achieving a limiting of the torque to be transmitted by means of cardan shafts is just as slim. There are furthermore difficulties when one of the two housings of the machines requires a subsequent sealing, for example for reasons of explosion protection.

The task of the present invention is to provide a magnetic clutch arrangement for connecting a working machine to a driving engine that has an increased tolerance with respect to misalignments and peak torques of the drive shaft and output shaft. According to the invention, this task is achieved by a magnetic clutch arrangement having the features of the main claim. Advantageous embodiments and developments of the invention are disclosed in the dependent claims, the description, and the figure.

The magnetic clutch arrangement according to the invention for connecting an output shaft of a drive to a drive shaft of a working machine, having a hub which has a hollow space, wherein a first set of magnets is arranged in the hub, and having a cardan shaft head which is arranged in the hollow space of the hub, wherein a second set of magnets is arranged on the circumference of the cardan shaft head, provides that the cardan shaft head and the hub are coupled either to the drive shaft or the output shaft so as to transmit torque, wherein the cardan shaft head is tilted by an angle $\alpha$ in the hollow space in the hub, so that an asymmetrical gap is formed between the hub and the cardan shaft head. The invention can in particular advantageously be used in an embodiment of a working machine as a pump and in a drive as a motor, in particular as an electric motor. The design of the magnetic clutch arrangement, which can also be called magnetic cardan shaft arrangement, between the working machine and the drive makes it possible to achieve an electrical insulation of the two components from each other, so that no stray leakage currents can be induced as a result of inductions in the working machine. In the case of peak torques in the transmission of power, the magnetic clutch additionally provides an automatic overload protection which, after reducing the drive torque, reliably works below the overload level, without maintenance or repair being necessary. While the clutch arrangements between the drive and the working machine of the prior art provide that no shaft offset exists in order to implement a minimum gap between the magnets on the cardan shaft head and the magnets in the hollow space of the hub, a tilting angle $\alpha$ is provided according to the invention, which allows for compensating assembly inaccuracies as well as manufacturing tolerances. As a result of the contactless power transmission of the magnetic clutch, a wear-free torque transmission is realized, which moreover does not have a mechanical speed limit as a result of the mounting of the shafts, in particular of a separate cardan shaft. A transverse power induction into the respective shaft pins is minimized and vibrations are transmitted not at all or only in a damped manner from the drive to the working machine. The torque transmission takes place without shock and without vibration, which reduces the wear and tear of the working machine and of the drive. As a result of the non-existing mechanical friction in the torque transmission, the noise development of the entire apparatus consisting of drive, working machine, and magnetic cardan shaft arrangement is reduced.

The hub can be fixed or formed on the output and/or drive shaft or on a cardan shaft so as to transmit torque. If a direct connection between the output shaft and drive shaft is established by means of the magnetic clutch arrangement, the hub is arranged or formed on one shaft and the cardan shaft head is arranged or formed on the other shaft. In the case of an interconnected cardan shaft, the cardan shaft can have two cardan shaft heads, two hubs, or one hub and one cardan shaft; the two other shafts are provided with corresponding cardan shaft heads or hubs.

An embodiment of the invention provides that a first cardan shaft head is arranged on a first end of a cardan shaft, that a second cardan shaft head is arranged on a second end of the cardan shaft, and that both cardan shaft heads are arranged in one hollow space each of two hubs, which are fixed to the output shaft and the drive shaft so as to transmit torque, wherein the cardan shaft heads and the hubs are designed to be corresponding to each other. Alternatively to an embodiment of the cardan shaft with two cardan shaft heads on its ends, it is also possible to arrange, on the ends of the cardan shaft, hubs or pot-like receptacles with hollow spaces for the magnets, which are arranged in the hubs or hollow spaces, and to provide the ends of the drive shaft and output shaft with cardan shaft heads on the outside of which are arranged magnets, i.e. to provide a geometric reversal of the arrangement of shaft head and hub. It is also possible to arrange a cardan shaft head on one side of the cardan shaft and a hub on the other end, wherein a corresponding design with a hub and a cardan shaft head is provided on the respectively assigned ends of the output shafts and drive shafts. On both ends of the cardan shaft, a combination of hub and shaft head is thus provided, which allows for a larger offset between the output shafts and the drive shafts, so that in principle non-parallel, non-aligned axes of shafts can also be allowed in the overall structure. As a result of the asymmetrical gap between the hubs and the shaft heads, a corresponding offset or a misalignment of the axis of the shafts is tolerated. In another embodiment of the invention, the cardan shaft is formed either by the drive shaft or by the output shaft, so that only one pair of hub and shaft head forms the magnetic cardan shaft arrangement.

Between the hub and the shaft head, in particular the cardan shaft head, a containment shell can be arranged, by means of which it is possible to form a leakage-free seal between the working machine and the driving engine. Two containment shells can also be provided, which can be arranged on the working machine, on the drive, or on the cardan shaft. By means of the containment shell, static sealing of the structure is possible, which is in particular advantageous in working machines to be sealed hermetically. Explosive media or highly aggressive media can likewise be processed, for example pumped, in the working machine, without a current or material passage taking place in the working machine and the medium to be pumped coming into contact with electrical components or even with the external atmosphere.

In a development of the invention, the shaft head, in particular the cardan shaft head, is mounted in the containment shell, for example by means of a roller bearing or in a slide bearing, wherein the roller bearing compensates for the angular offset and is preferably designed as a cylindrical roller bearing or a spherical roller bearing. As a result of the spherical design of the slide bearing, it is possible to tolerate a corresponding offset of the shafts.

A development of the invention provides that the outer contour of the shaft head, i.e. of the drive or output shaft head or of the cardan shaft head, and the inner contour of the hollow space which receives the shaft head with the magnets are cylindrical, which facilitates manufacturing of both the shaft heads and the hollow spaces. In order to make the asymmetrical gap between the hub and the shaft head possible, the outside diameter of the shaft head is smaller than the inside diameter of the hub. The diameter difference and thus the maximum gap width is substantially dependent on the offset angle and the insertion depth of the shaft head in the hub and is preferably selected such that a minimum gap results. The dimensioning takes place on the basis of the planned operating conditions, installation situation, and design parameters. The axis of rotation of the respective cardan shaft head is preferably oriented at an angle between 0.5° and 5°, in particular between 0.5° and 1.5°, to the axis of rotation of the drive shaft and/or of the output shaft.

A variant of the invention provides that the outer contour of the shaft head is designed to be convex and the inner contour of the hollow space is designed to be cylindrical or concave. As a result of the contour of the shaft heads and of the hollow space deviating from the cylindrical contour, it is possible to compensate for an angular offset and to realize a consistent distance, i.e. a distance that is constant over the length of the magnets, between the hollow space of the hub and the shaft head at least in one orientation of the shaft.

The hub can be fixed on the respective shaft in a form fit, for example by means of a polygonal profile or by means of a fitted key, whereby it is possible to arrange different hubs on the respective shafts and to adapt the hubs to the respective shaft heads.

An apparatus with a drive with an output shaft, a working machine with a drive shaft, and with a magnetic clutch or cardan shaft arrangement as described above provides according to the invention that the working machine and the drive are connected firmly to each other, for example by fixing the respective housings to each other. The drive shaft and the output shaft are arranged at an offset to each other, preferably however paraxially, so that only a single alignment error of the axes of the respective shafts relative to each other occurs and must be compensated for by means of the gap between the hub and the respective shaft head.

A development of the invention provides that the working machine and the drive are aligned with each other; the housing of the working machine and the housing of the drive are advantageously aligned with each other.

In one embodiment of the invention, the working machine is designed as a screw pump or eccentric screw pump, which are in particular suitable for pumping foods, highly viscous media, hydrocarbons, and aggressive media. The offset angle between the drive shaft and the output shaft is between 0.5° and 5°, preferably between 0.5° and 1.5°, whereby a sufficient torque transmission on the one hand and a sufficient fault tolerance with respect to the offset of the axes of the shafts relative to each other on the other hand can be achieved.

The drive and the working machine can be flange-mounted on each other, wherein the magnetic clutch arrangement can be arranged in a separate housing which is flange-mounted between the drive and the working machine. Alternatively, thereto, the magnetic clutch arrangement is arranged in one of the housings of the drive or of the working machine.

The apparatus consisting of drive and working machine can also be designed as downhole pump assembly and serve to pump hydrocarbons.

Figure 2:
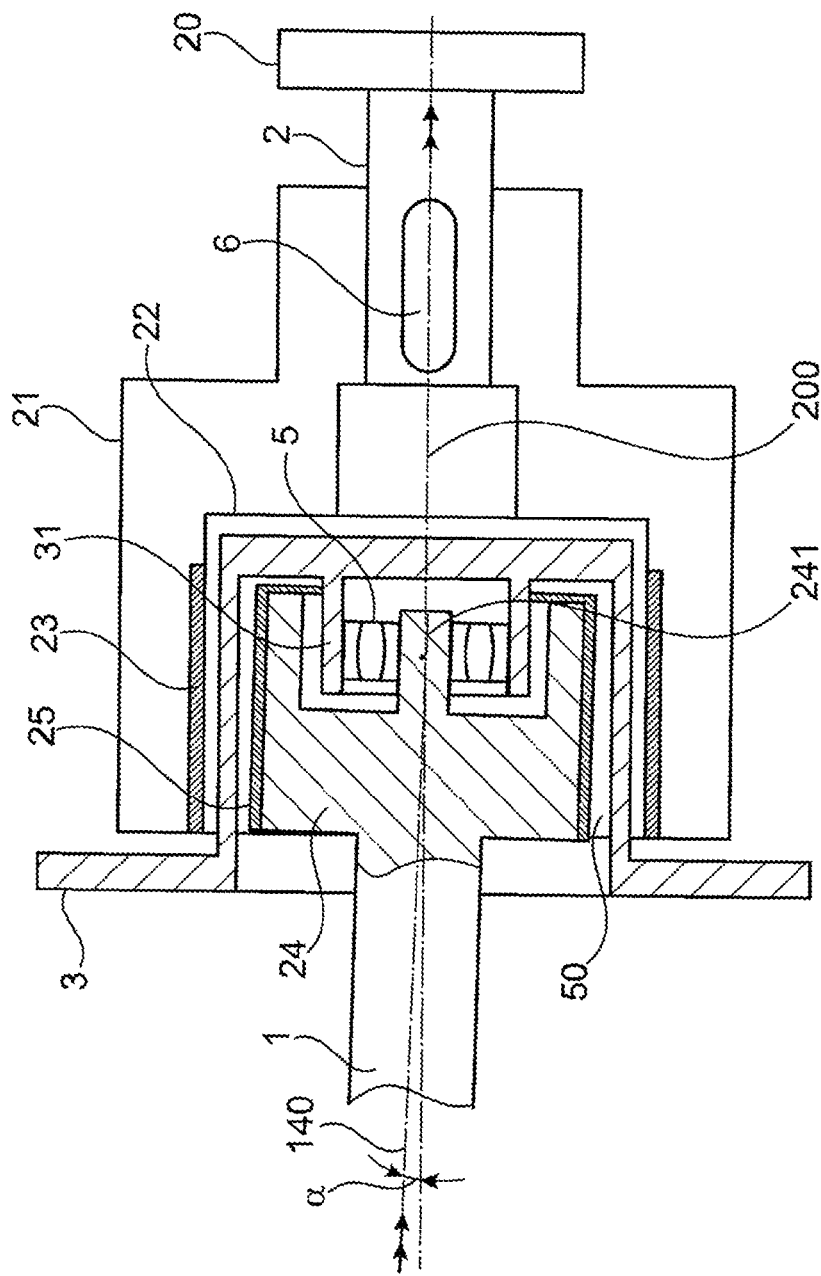
Figure 3:
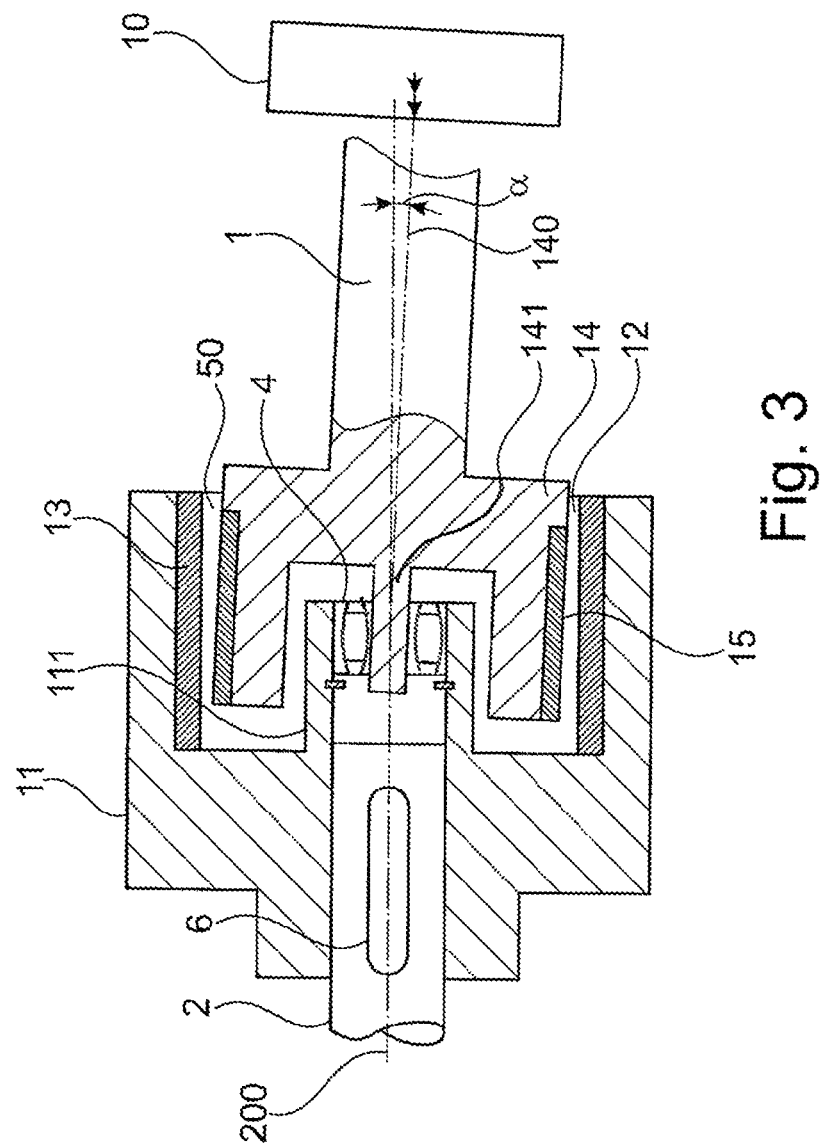

One exemplary embodiment of the invention is explained below with reference to the figures. The same reference symbols in different figures denote the same components. The figures show:

FIG. 1 a schematic sectional view of the coupling of an output shaft of a drive and a drive shaft of a working machine by means of a cardan shaft;

FIG. 2 a sectional view of a direct connection of an output shaft having a cardan shaft head and a containment shell;

FIG. 3 a variant of FIG. 2 without containment shell; as well as

Figure 4:
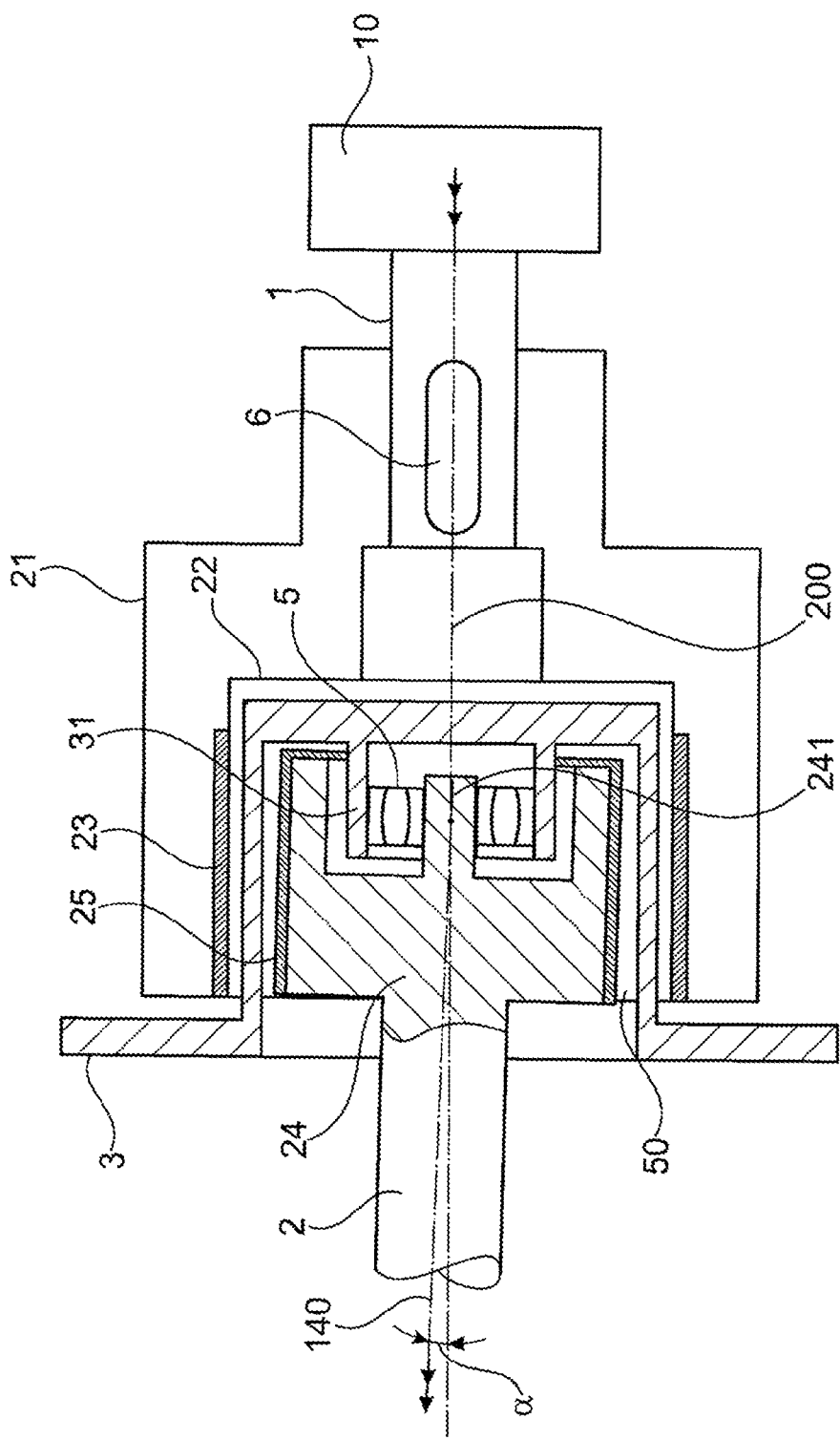

FIG. 4 a variant of FIG. 2 with a direct connection of the cardan shaft head to a drive shaft.

FIG. 1 shows a schematic sectional view of an apparatus having a drive 10 and a working machine 20, which are coupled to each other by means of a cardan shaft arrangement. The drive 10 has an output shaft 1, which is connected to a first hub 11 in a form-fitting manner by means of a fitted key 10 so as to transmit torque. Instead of the fitted key 6, another form-fitting coupling between the output shaft 1 and the hub 6 can also be formed, for example by means of a polygonal tooth system or another form-fitting coupling.

The hub 11 has a hollow space 12, which is designed in the shape of a pot and has, on its inner circumference, a set of magnets 13 which is formed with an alternating polarity in the circumferential direction. Within the hollow space 12, a cardan shaft head 14 is arranged, which has a substantially cylindrical outer contour, which corresponds to the inner contour of the hollow space 12 of the hub 11. A gap 50 is formed between the outer contour of the cardan shaft head 14 and the inner contour of the hollow space 12. A second set of magnets 15 which is also arranged in an alternating polarity is mounted on the outer circumference of the cardan shaft head 14. By means of the two sets of magnets 13, 15, it is possible to transmit torque in a contactless manner from the drive 10 via the output shaft 1 and the hub 11 to the cardan shaft head 14.

Within the hollow space 12, the hub 11 has a sleeve 111 which is designed to be integral with the hub 11. The sleeve 111 can alternatively be designed as a separate component. The sleeve 111 serves to receive a guide bearing 4 in the form of a roller bearing, for example as a spherical roller bearing or toroidal roller bearing. In the bearing 4, the cardan shaft head 14 is mounted rotatably by means of a guide pin 141; no torque is transmitted via the mechanical bearing point of the guide bearing 4.

The torque that is transmitted from the output shaft 1 to the cardan shaft head 14 is transmitted further via a cardan shaft 16. The cardan shaft 16 transmits the torque to a second cardan shaft head 24 which is arranged on the end of the cardan shaft 16 opposite the first cardan shaft head 14. On the outside of the second cardan shaft head 24, a set of external magnets 25 is arranged in alternating polarity.

A central pin 241 of the second cardan shaft head 24 is mounted in a second guide bearing 35 in a sleeve 31 of a containment shell 3, which is mounted either on a second hub 21 or separately on a housing, instead of in a hub sleeve. The containment shell 3 achieves a complete, hermetic separation between the drive 10 and the working machine 20.

The second cardan shaft head 24 is mounted rotatably within the containment shell 3; the containment shell 3 can also be fixed in a stationary manner. The containment shell 3 has an inner hollow space 32, in which the second cardan shaft head 24 rotates and which has a substantially cylindrical, pot-shaped inner and outer contour.

The containment shell 3 is arranged in a hollow space 22 of the second hub 21; on the inner circumference of the hollow space 22 is arranged a second set of magnets 23 which also has an alternating polarity, so that the torque of the cardan shaft 16 can be transmitted to the hub 21 via the external magnets 25 and the internal magnets 23. The hub 21 is fixed on a drive shaft 2 of the working machine 20 in a form-fitting manner by means of a fitted key 6; analogously to the mounting of the output shaft 1, another form-fitting coupling is also provided between the hub 21 and the drive shaft 2.

The output shaft 1 of the drive 10 is arranged at an offset to the drive shaft 2 of the working machine 20, so that a misalignment of the cardan shaft 16 with respect to the orientation of both the drive shaft 2 and the output shaft 1 exists. This results in a tilting of the cardan shaft head 14, 24 in the hollow space 12, 22 of the respective hub 11, 21 by an angle $\alpha$, so that an asymmetrical gap 50 forms between the hub 11, 21 and the respective cardan shaft head 14, 24. The tilting by the angle $\alpha$ and the asymmetrical gap 50 are explained later.

The working machine 20 and the drive 10 can be flange-mounted to each other and form a modularly structured apparatus, for example a downhole pump assembly, in which the drive 10 is designed as an electric motor and the working machine 20 is designed as a pump. It is also possible that a cardan shaft head is arranged directly on the output shaft 1 or on the drive shaft 2, so that the interconnection of a separate cardan shaft 16 can be omitted. By means of the containment shell 3, the drive 10 and the working machine 20 are separated in a leakage-free and static manner. In principle, it is also possible to arrange the containment shell 3 between the first hub 11 and the first cardan shaft head 14; two containment shells 3 can likewise be provided, which are arranged between the hubs 11, 21 and the cardan shaft heads 14, 24.

FIG. 2 shows a schematic sectional view of a variant of the embodiment of FIG. 1, in which only one cardan shaft head 24 is provided on one end of an output shaft 1 of a drive not shown instead of a separate cardan shaft 16 with two cardan shaft heads 14, 24 on the respective ends. In FIG. 2, the tilting angle $\alpha$ can be seen, which illustrates the offset of the axis of rotation 240 of the output shaft 1 or of the cardan shaft head 24 to the axis of rotation 200 of the drive shaft 2 of the working machine 20. The tilting takes place in the center of the guide bearing 5 within the containment shell 3. By connecting the cardan shaft head 24 directly to the output shaft 1, it is possible to couple a drive 10 and a working machine 20 over a short distance to each other and to also compensate for an assembly offset between the drive 10 not shown and the schematically illustrated working machine 20 there and to moreover implement the advantages of a contactless and otherwise decoupled torque transmission. The cardan shaft head 24 can be designed to be integral with the output shaft 1 or be fixed to the output shaft 1 in a form-fitting and force-fitted manner, for example by screwing, by a polygonal tooth system, or by welding or even by means of alignment pins or fitted keys.

Another variant of the invention is shown in FIG. 3, in which a direct connection of a schematically illustrated drive 10 via an output shaft 1 and a cardan shaft head 14 without a containment shell 3 to a hub 11 is shown. In this case, the tilting angle $\alpha$ can also be seen, which exists between the axis of rotation 140 of the output shaft 1 and the axis of rotation 200 of the drive shaft 2.

Both in FIG. 2 and in FIG. 3, the cardan shaft heads 14, 24 are designed with a substantially cylindrical circumferential wall in order to simplify production, said cardan shaft heads being received in the also substantially cylindrical hollow space 12, 22 of the respective hub 11, 21. As a result of the tilting by the angle $\alpha$, an asymmetrical gap 50 results, which is indicated graphically. In FIG. 2, the upper end of the cardan shaft head 24 faces the drive and is significantly closer to the containment shell 3 than the opposite lower end, since the axis of rotation 140 of the output shaft 1 is tilted upwards, while, in the illustration of FIG. 3, the lower end of the cardan shaft head 14 is significantly closer to the magnets 13 than the upper end. In the region of the largest distance of the internal and external magnets to each other, a lesser torque transmission results, while a maximum torque transmission results in the region of the closest distance. The pivot point of the tilting, i.e. the center of the respective guide bearing 4, 5, is advantageously in the center of the length of the internal and external magnets, at least in the center of the external magnets, so that an even torque transmission results, since an even torque transmission distribution takes place in this way. The internal magnets preferably do not protrude from the hollow space in order to avoid transmission losses.

FIG. 4 shows another variant of the invention, in which the basic structure corresponds to that of FIG. 2; the explanations regarding FIG. 2 apply accordingly but with the exception that a drive or motor 10 directly acts via an output shaft 1 on a hub 21, in which the internal magnets 23 are arranged on the circumference as second set of magnets.

A containment shell 3 is arranged in the cylindrical recess or in the cylindrical hollow space 22 within the hub 21; the containment shell 3 can have an outside diameter that substantially corresponds to the inside diameter of the hollow space 22. The gap shown in FIG. 4 between the hollow space 22 and the outer contour of the containment shell 3 can be minimized in the mounted state of the containment shell 3.

Within the containment shell 3, the cardan shaft head 24 is tilted by an angle $\alpha$. The drive shaft 2 for a working machine 20 not shown is formed on the cardan shaft head 24 or is fixed thereto in another embodiment, for example by means of a fitted key, an interference fit, or another form-fitting connection.

The invention claimed is:

1. A magnetic clutch arrangement for connecting an output shaft (1) of a drive (10) to a drive shaft (2) of a working machine (20), comprising:
   a hub (11, 21),
   the hub (11,21) having a hollow space (12, 22);
   a first set of magnets (13, 23) being arranged in the hollow space (12, 22);
   a cardan shaft head (14, 24) being arranged in the hollow space (12, 22) of the hub (11, 21);
   a second set of magnets (15, 25) being arranged on the circumference of the cardan shaft head (14, 24);
   the cardan shaft head (14, 24) and the hub (11, 21) being coupled either to the drive shaft (2) or the output shaft (1) so as to transmit torque; and
   the cardan shaft head (14, 24) being tilted by an angle α in the hollow space (12, 22) of the hub (11, 21), so that an asymmetrical gap (50) forms between the hub (11, 21) and the cardan shaft head (14, 24).

2. The magnetic clutch arrangement according to claim 1, characterized in that the hub (11, 21) is fixed or formed on the output and/or drive shaft (1, 2) or on a cardan shaft (16) so as to transmit torque.

3. The magnetic clutch arrangement according to claim 1, characterized in that the cardan shaft head (14, 24) is formed or fixed on the output shaft (1) or on the drive shaft (2) or on a cardan shaft (16) so as to transmit torque.

4. The magnetic clutch arrangement according to claim 1, characterized in that a first cardan shaft head (14) is arranged on a first end of the cardan shaft (16), that a second cardan shaft head (24) is arranged on a second end of the cardan shaft (16), and that both cardan shaft heads (14, 24) are arranged in one hollow space (12, 22) each of two hubs (11, 21), which are fixed to the output shaft (1) and the drive shaft (2) so as to transmit torque, wherein the cardan shaft heads (14, 24) and the hubs (11, 21) are designed to be corresponding to each other.

5. The magnetic clutch arrangement according to claim 1, characterized in that a containment shell (3) is arranged between the hub (11, 21) and the cardan shaft head (14, 24).

6. The magnetic clutch arrangement according to claim 5, characterized in that the cardan shaft head (14, 24) is mounted in the containment shell (3).

7. The magnetic clutch arrangement according to claim 1, characterized in that the outer contour of the cardan shaft head (14, 24) and the inner contour of the hollow space (12, 22) are designed to be cylindrical or the outer contour of the cardan shaft head (14, 24) is designed to be convex and the inner contour of the hollow space (12, 22) is designed to be cylindrical or concave.

8. The magnetic clutch arrangement according to claim 1, characterized in that the hub (11, 21) is fixed in a form-fitting manner on the respective shaft (1, 2, 16).

9. The magnetic clutch arrangement according to claim 1, characterized in that the axis of rotation (140, 240) of the cardan shaft head (14, 24) is oriented at an angle between 0.5° and 5°, preferably between 0.5° and 1.5°, to the axis of rotation (100, 200) of the drive shaft (2) and/or of the output shaft (1).

10. An apparatus with a drive (10) with an output shaft (1), a working machine (20) with a drive shaft (2), and with a magnetic clutch arrangement according to claim 1, wherein the working machine (20) and the drive (1) are firmly connected to each other and the drive shaft (2) and the output shaft (1) are arranged at an offset to each other.

11. The apparatus according to claim 10, characterized in that the working machine (20) and the drive (10) are aligned with each other.

12. The apparatus according to claim 10, characterized in that the working machine (20) is designed as a screw pump or as an eccentric screw pump.

13. The apparatus according to claim 10, characterized in that the offset angle between the drive shaft (2) and the output shaft (1) is between 0.5° and 5°, preferably between 0.5° and 1.5°.

14. The apparatus according to claim 10, characterized in that the drive (10) and the working machine (20) are flange-mounted to each other and the magnetic clutch arrangement is arranged in a housing.

15. The apparatus according to claim 10, characterized in that the apparatus is designed as a downhole pump assembly.

* * * * *